United States Patent
Reynov et al.

(10) Patent No.: US 6,980,568 B1
(45) Date of Patent: Dec. 27, 2005

(54) METHOD AND APPARATUS FOR SYSTEM CLOCK SYNCHRONIZATION

(75) Inventors: Boris Reynov, Cupertino, CA (US);
Raanan Ben-Zur, Campbell, CA (US);
Nicholas A. Balatoni, Santa Clara, CA (US)

(73) Assignee: Ciena Corporation, Linthicum, MD (US)

( * ) Notice: Subject to any disclaimer, the term of this patent is extended or adjusted under 35 U.S.C. 154(b) by 890 days.

(21) Appl. No.: 09/906,990

(22) Filed: Jul. 17, 2001

(51) Int. Cl.[7] .............................................. H04J 3/06
(52) U.S. Cl. ...................................... 370/503; 370/219
(58) Field of Search ................................ 370/503, 244, 370/217–221, 225, 227, 254, 400, 516, 522

(56) References Cited

U.S. PATENT DOCUMENTS

| | | | | |
|---|---|---|---|---|
| 4,300,230 A | * | 11/1981 | Philip et al. ................. | 370/244 |
| 5,796,795 A | * | 8/1998 | Mussman et al. ........... | 375/372 |
| 5,953,314 A | * | 9/1999 | Ganmukhi et al. ......... | 370/220 |
| 6,078,595 A | * | 6/2000 | Jones et al. ................. | 370/503 |
| 6,301,269 B1 | * | 10/2001 | Tayloe et al. ............... | 370/519 |
| 6,317,439 B1 | * | 11/2001 | Cardona et al. ............ | 370/503 |
| 6,389,013 B1 | * | 5/2002 | Doss et al. .................. | 370/364 |
| 6,658,579 B1 | * | 12/2003 | Bell et al. ................... | 713/400 |
| 6,839,858 B1 | * | 1/2005 | James et al. ................ | 713/400 |

* cited by examiner

*Primary Examiner*—Ajit Patel
*Assistant Examiner*—Chirag Shah
(74) *Attorney, Agent, or Firm*—Michael R. Cammarata; David L. Soltz

(57) ABSTRACT

According to one embodiment, a method is disclosed. The method comprises receiving a first set of clock signals from a first clock unit at a second clock unit whenever the first clock unit is operating. The method further includes receiving a signal indicating that the second clock unit is to enter into the operating mode; and entering a holdover mode at a protection timing unit within the second clock unit. In the holdover mode, the protection timing unit generates output clock signals based upon the first set of clock signals received from the first clock unit at the second clock unit.

17 Claims, 4 Drawing Sheets

METHOD AND APPARATUS FOR SYSTEM CLOCK SYNCHRONIZATION

FIELD OF THE INVENTION

The present invention relates to networking systems; more particularly, the present invention relates to the synchronization of networking systems.

BACKGROUND

With the maturation of the computer and surrounding technologies, vast amounts of complex, mixed traffic types are transmitted through synchronous optical networks (SONETs). The SONET standard is described in the American National Standards Institute (ANSI) standards T1.105 and T1.106 and in the Bellcore Technical Recommendations TR-TSY-000253.

The basic building block of SONET networks is the SONET ring connection. FIG. 1 illustrates a basic SONET ring connection. SONET switch 100 and SONET switch 150 receive optical signals from various devices (not shown in FIG. 1). SONET switch 100 and SONET switch 150 can be coupled to other SONET switches, or other devices that communicate data using optical signals.

SONET switch 100 and SONET switch 150 communicate using two sets of unidirectional signaling pairs. In general, half of the data traffic between switches travels over one of the signaling pairs and the other half of the traffic travels over the other signaling pair. SONET switches communicate according to a predetermined protocol, and at a predetermined bit rate. Telecommunications (Telco) SONET systems have been designed and implemented using digital signaling (DS) technology, which is well known in the art.

For proper transmission of data traffic between the sonet switches, the destination switch receives data at the same rate as the source switch. Therefore, SONET switch 100 and SONET switch 150 typically include system clock units to facilitate the synchronization of traffic. The system clock units provide a reference clock source for transactions received and transmitted from a switch. SONET switch 100 and SONET switch 150 each include backup clock units for redundancy in the event a failure occurs at the primary clock unit.

Often, a problem in synchronization may occur upon switching from a primary clock unit to a backup clock unit. Moreover, it may take several seconds for resynchronization to occur. Such a large delay in synchronization may cause entire data packets received at or transmitted from a switch to be garbled or lost. The loss of data packets forces retransmission, which slows the network. Therefore, what is desired is a method and apparatus for fast resynchronization upon switching from a primary clock unit to a backup clock unit.

SUMMARY

According to one embodiment, a network switch is disclosed. The network switch comprises a clock input output (I/O) unit, a first clock unit and a second clock unit. The first clock unit includes a first relay coupled to the first input of the clock I/O card, a first termination module coupled to the first relay, a first framer coupled to the first termination module, and a first multiplexer coupled to the first framer. The second clock unit includes a second relay coupled to the first input of the clock I/O card, a second termination module coupled to the second relay a second framer coupled to the second termination module, and a second multiplexer coupled to the first framer and the second framer. Clock reference signals from the first input are received from the first framer whenever the second clock unit is operating in a backup mode.

In yet another embodiment, a method is disclosed. The method includes receiving extracted frame clocks at a protection clock unit from a framer within an operating clock unit and transmitting the extracted frame clocks to a timing unit within the protection clock unit.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
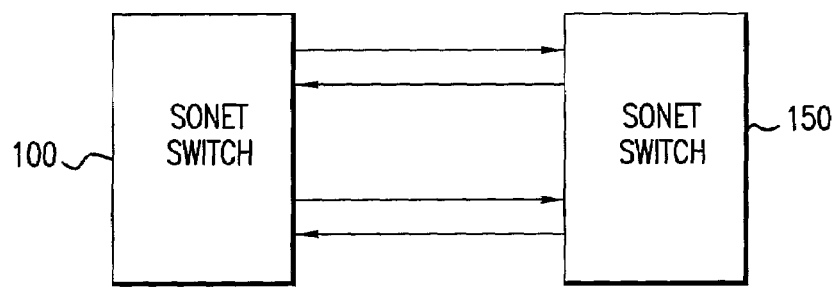
FIG. 1 illustrates a basic synchronous optical network (SONET) ring connection.

Methods and apparatuses for and related to SONET data manipulation are described herein. According to one embodiment, A SONET switch includes an input/output (I/O) card coupled between a working clock unit and a protected clock unit. While, the I/O clock card is physically terminated to both clock cards, the I/O clock card may be electrically terminated to only one clock card at any given time. During normal operation the I/O clock card is electrically terminated to the working clock unit. However, in order to provide a clock input to the protected clock card during normal operation, an output of a framer within the working clock card is transmitted to a multiplexer within the protected clock card.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The description herein is set forth in terms of SONET hierarchies and protocols; however, the description applies equally to SDH hierarchies and protocols as well. Described herein are components of, and operations within, a switching system that performs switching and routing between interface cards coupled via a backplane. In one embodiment, cross-connect components switch SONET formatted data. In one embodiment, the switching system interface cards envelope data in a SONET based format that includes B1 bit error checks, framing, and scrambling. To provide sufficient bandwidth time and space switching is accomplished by an application specific integrated circuit (ASIC) described in greater detail below. The Time and Space Switching ASIC is referred to herein as a "TISSA". In one embodiment, the TISSA is an independent integrated circuit.

In one embodiment, the TISSA is a 16×11 device that has 16 STS-48 input ports on a first side and 11 STS-48 output ports on a second and/or third side and both the I/O ports and the TISSA operate a 155 MHz internal clock. The clock frequencies are selected for SONET specification compliance, and are not limited by the ASIC design. Other clock frequencies could be used for different applications. Also, other I/O port layouts can be provided.

The operational speed set forth above allows the TISSA to switch an entire STS-48 frame between two ports within a 48-clock cycle window. The operational speed also allows the TISSA to select an STS-1 signal from an STS-48 input frame on a first port and switch the selected STS-1 signal to a second port within an 48-clock cycle window. In alternate embodiments, the TISSA can switch data using four byte groupings of data. TISSA switching characteristics apply to other signal rates (e.g., STS-3, STS-12) as well.

The switching system can include various interface cards that support transmission of DS-N, Ethernet, and OC-N signals, where N is any SONET supported (e.g., 1, 3, 12, 48, 192, 768) data rate. Further, the DS-N cards can be configured to receive/transmit signals in a frame relay (FR) or asynchronous transfer mode (ATM) format. The data transfer between the various communications cards and the TISSA is performed by a second ASIC, referred to as a High Speed Serial ASIC, or HISSA. In one embodiment, the HISSA operates on a 77 MHz clock. The HISSA generates SONET formatted data and reduces the footprint created by the switching system backplane interface between the communications cards and the cross-connect card. This results in improved signal integrity, any service in any slot, and differential pair signaling to transmit data at higher frequencies while reducing signal lines.

In one embodiment, the HISSA generates SONET formatted data by performing bit stuffing and bit destuffing and scrambling for phase locked loop (PLL) locking. In one embodiment, the HISSA reduces the backplane footprint by transforming the communications card parallel signals to serial signals and thereafter reversing the parallel-to-serial conversion on the cross-connect card. For example, in one embodiment, the switching system supports STS-48 communication bandwidth between cards. Accordingly, the HISSA uses differential pair circuitry to generate eight lines (each pair operating at 622 MHz) that transfer the data between the communications card and the cross-connect card. Subsequently, another HISSA in the cross-connect card regenerates the STS-48 data prior to TISSA data switching.

In one embodiment, the communications cards have the ability to convert a data protocol within the card. For example, the switching system could receive a DS-3 frame relay input on a first card and switch the signal to an OC-3 output on a second card. In particular, the HISSA/TISSA switching results in a SONET format output being transferred to the second card via the backplane. Additionally, the second card could also be configured to switch the data output on the card into an ATM format. Accordingly, the output of the second card would be a SONET based OC signal in an ATM, or other, format. This feature allows the switching system to integrate seamlessly with conventional SONET ring systems that use large-scale ATM switches to manipulate data transmissions.

Network Architecture Overview

Figure 2:
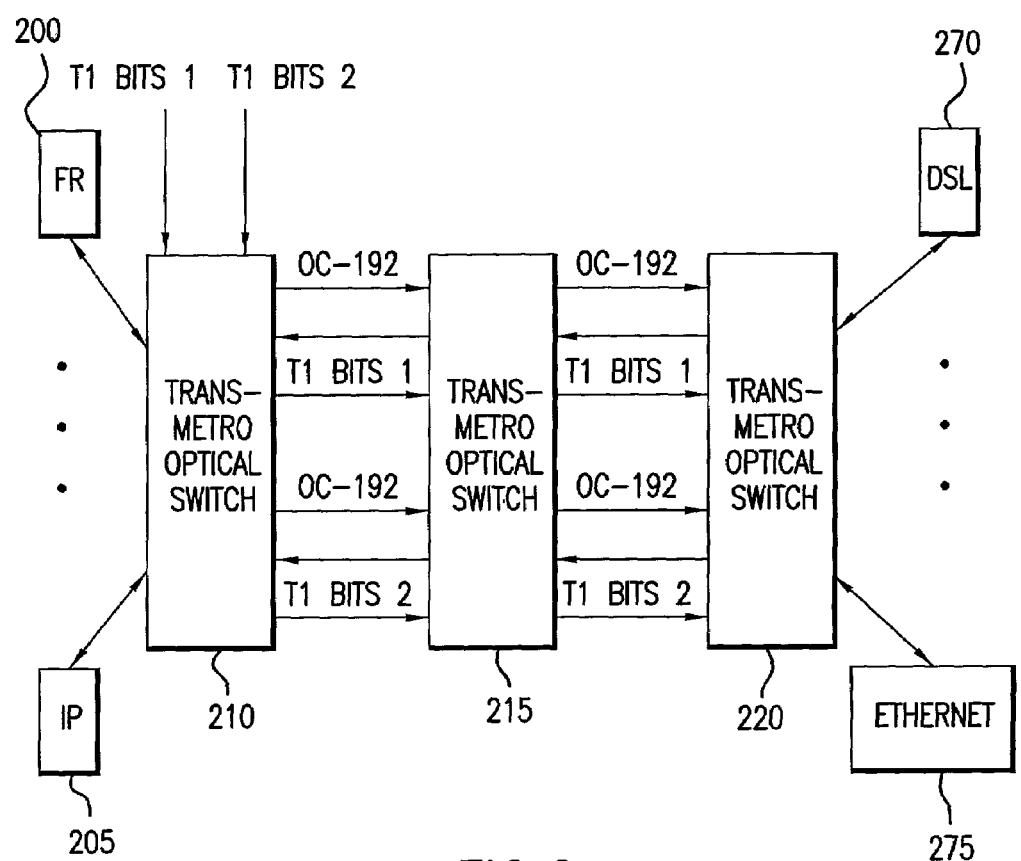
FIG. 2 illustrates one embodiment of a SONET architecture having Trans-Metro Optical (TMO) switches.

FIG. 2 illustrates one embodiment of a SONET architecture having Trans-Metro Optical (TMO) switches. As described in greater detail below, TMOs provide multiple functions and allow non-voice data to be carried in a more efficient manner than typical SONET switches. FIG. 2 provides an example of a network having TMOs. However, the description of FIG. 2 in not intended to limit in any way the potential uses of a network having one or more TMOs.

TMO 210 is coupled to FR device 200 and to IP device 205. TMO 210 may also be coupled to other devices such as local area networks, ATM devices or PBXs (not shown in FIG. 2). In addition, TMO 210 receives two Building Integrated Timing Supply Clocks (T1 BITS 1 and T1 BITS 2). The T1 BITS 1 and T1 BITS 2 clocks are synchronizing clocks that are used for synchronization at TMO 210, and are transmitted to the other network elements for synchronization. TMO 220 is coupled to DSL device 270 and to Ethernet device 275. TMO 220 can also be coupled to other devices, such as Terabit routers or optical cross-connects (not shown in FIG. 2).

TMO 210 and TMO 220 provide an interface between a SONET ring and customer premises and/or other non-SONET equipment. Signals passed between FR device 200, IP device 205, or other devices (not shown in FIG. 2) are typically electrical signals; however optical signals can also be supported. Similarly, DSL device 270, Ethernet device 275, or other devices (not shown in FIG. 2) communicate with TMO 220 via electrical and/or optical signals. TMO 210 is coupled to TMO 215 in the same manner as SONET switches are interconnected. The connection between TMO 210 and TMO 215 is illustrated as OC-192; however, any SONET line rate can be used. Similarly, TMO 220 is illustrated coupled to TMO 215 with OC-192 line rate connections, while other line rates can be used.

In general, each TMO provides multiple SONET platforms into a single TMO platform. In one embodiment, each TMO provides switching scalability from DS-1 to OC-768, full function add/drop multiplexer (ADM) capabilities, multi-service circuit and packet provisioning, and advanced bandwidth optimization and management. In alternate embodiments, other SONET protocols (e.g., bit rates greater than OC-768) can also be supported.

TMOs are data-optimized SONET transport platforms. In one embodiment, TMO switching gear utilizes HISSAs and TISSAs to perform many of the core functions. As a result, the TMO switch form factor is substantially smaller and consumes less power than current rack mount SONET systems. In general, the HISSA provides the ability to carry SONET framed data at various SONET data rates, for example, OC-192. The TISSA supports the ability to route/switch signals between HISSAs. The combination of TISSAs and HISSAs results in a powerful SONET switching platform.

TMOs can be used to transition SONET to a data-centric traffic model by simplifying current MAN topologies. Using TMOs, carrier customers retain their LAN protocol (Ethernet, ATM, FR, IP) and time division multiplex (TDM) services, which allows the customers to preserve their technology investment while receiving the benefit of improved SONET communications.

Within existing MAN topologies, service access multiplexers can be replaced with TMO switches at the ingress/ egress points of OC-12 to OC-192 local loops and at OC-48 to OC-768 MAN edges. TMO switches support the full range of SONET line rates, and eliminate the discrete network elements previously required at each add/drop point. TMO switching can also be used to interconnect MAN edges with the network core. Here, core ATM switches groom aggregated traffic for transport over long haul OC-192/OC-768 connections. In one embodiment, TMO switches offer 4:1 statistical multiplexing so bandwidth is more effectively used in point-to-point SONET links.

Switch Architecture Overview

Figure 3:
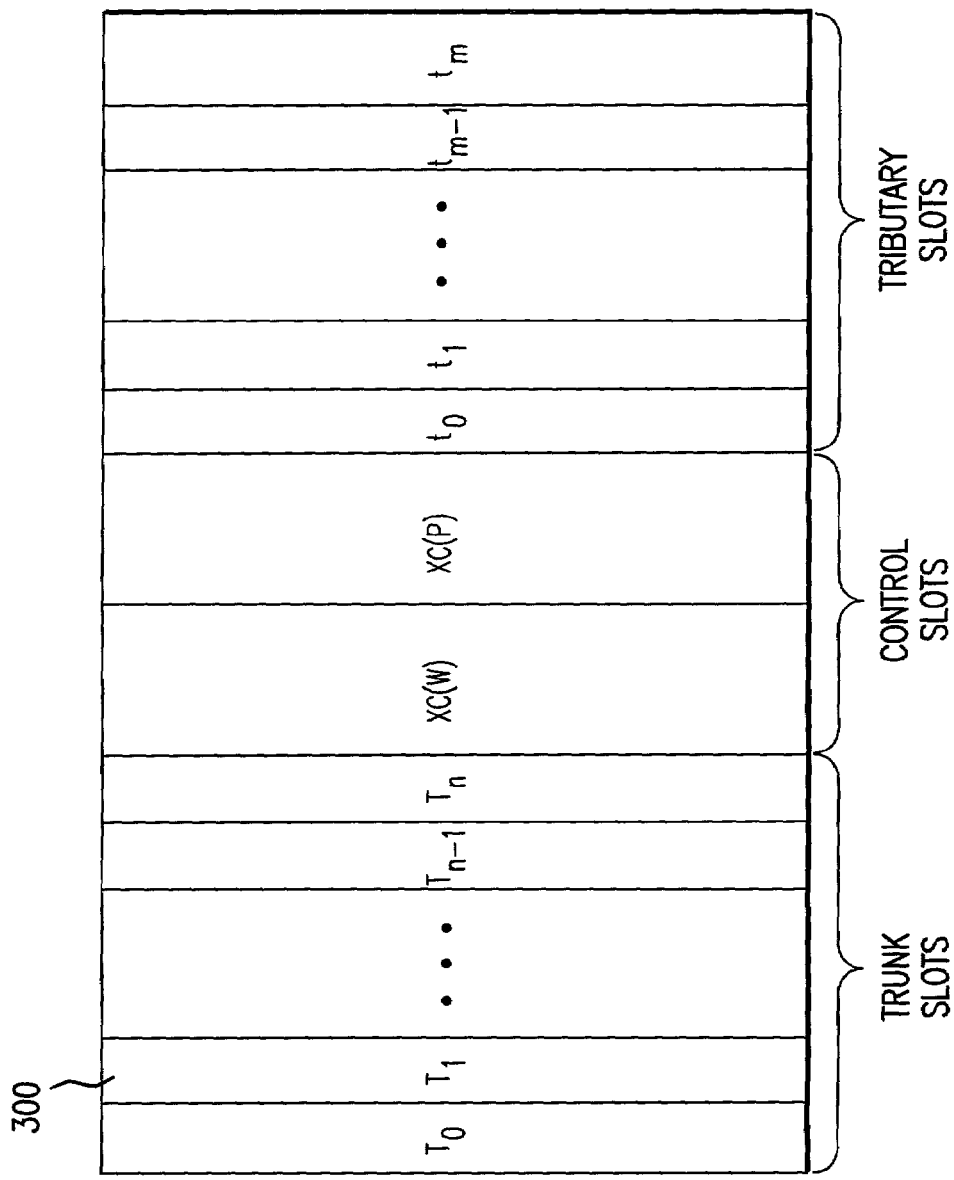
FIG. 3 illustrates one embodiment of a TMO switch configuration.

FIG. 3 illustrates one embodiment of a TMO switch configuration. In one embodiment, a TMO switch includes a backplane (not shown in FIG. 3) that interconnects multiple cards that are inserted into slots in TMO switch body 210. In one embodiment, the TMO switch has two cross-connect (XC) cards, one of which is active, or the working cross-connect (XC-W), and the other of which is a protection cross-connect (XC-P) that provides redundancy for the working cross-connect.

Interface cards are divided into two categories: trunk cards and tributary cards. In one embodiment, trunk cards (T0 through Tn) are positioned on one side of the cross-connect cards and tributary cards (t0 through tm) are positioned on the opposite side of the cross-connect cards. In general, trunk cards are used to provide an interface to one or more other devices using high speed SONET connections (e.g., OC-192, OC-768) and tributary cards are used to provide interfaces to one or more lower speed devices (e.g., DS1, ATM, FR, DS3).

The cross-connect card allows data to be communicated between tributary cards and trunk cards. For example, multiple DS3 tributary cards can receive data from multiple sources and the data received via the tributary cards can be combined and communicated to another TMO switch via an OC-48 connection. Alternatively, multiple Ethernet and IP cards and receive data from multiple LANs and the data can be combined and transmitted using a SONET protocol.

Figure 4:
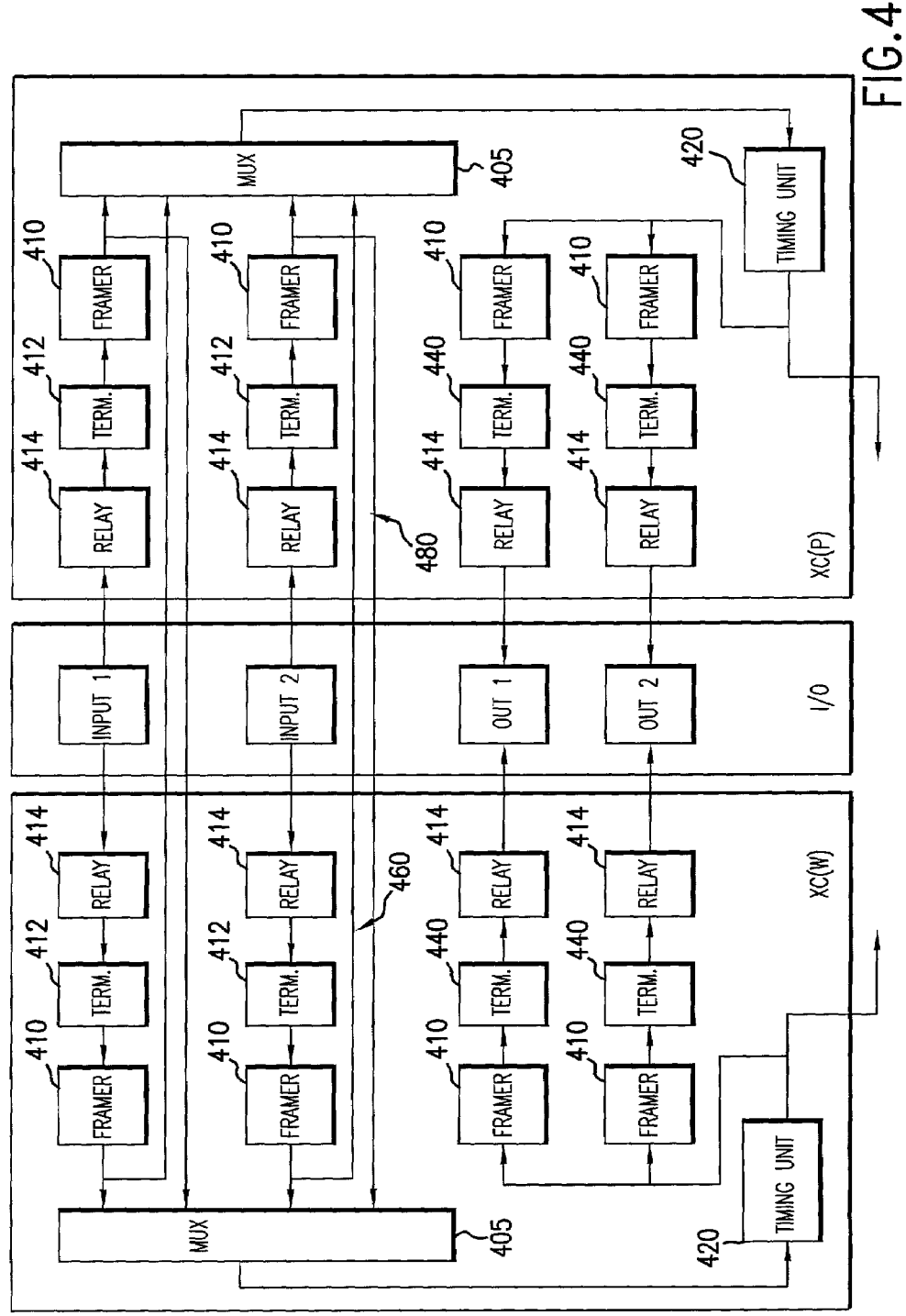
FIG. 4 illustrates one embodiment of a clock synchronization module.

According to one embodiment, each cross-connect card includes a clock unit. The working and protection clock units, along with a clock input/output (I/O) card provide a system clock unit for the TMO switch. FIG. 4 is a block diagram of one embodiment of an interconnection of the TMO system clock unit. Referring to FIG. 4, the clock I/O card includes two clock reference inputs (input 1 and input 2). According to one embodiment, input 1 and input 2 receive high quality T1 reference signals from separate external clock standards, such as Stratum 1 or Stratum 2 clock standards.

In a further embodiment, inputs 1 and 2 receive references from BITS clock sources. BITS designates one clock as the synchronization source within the network. Further, BITS ensures that the network maintains traceability to the Stratum 1 reference source. Nevertheless, one of ordinary skill in the art will appreciate that other clock sources and standards may be used for implementation of inputs 1 and 2.

The clock I/O card also includes two clock reference outputs (output 1 and output 2). According to one embodiment, output 1 and output 2 transmit the BITS references received at input 1 and input 2, respectively, to other TMO boxes on the same SONET ring or on connected SONNET rings as illustrated in FIG. 2. Specifically, the BITS 1 and BITS 2 inputs received at TMO switch 210 are transmitted to TMO switch 215, and from TMO switch 215 to TMO switch 220. Accordingly, if the other TMO switches do not have direct access to a BITS clock, the clocking signals transmitted at output 1 and output 2 (FIG. 4) may be used as primary reference clocks.

Each of the clock units (e.g., working and protection) include a relay 414 coupled to inputs 1 and 2 within the clock I/O card. In addition, relays 414 are coupled to outputs 1 and 2 of the clock I/O card. Relays 414 function as a switch that enables the card to receive or transmit clock references to the clock I/O card. According to one embodiment, a processor (not shown) controls the relay 414 contacts on the respective card. For example, the processor on the working card transmits a signal to close the contact of relay 414, thereby coupling input 1 and termination module 412. Moreover, the relay contacts within the protected clock unit are open since no signal is transmitted from the protected processor card. For one embodiment, Relay 414 includes metal contact coupled between two contact points. The metal contact is also coupled to a coil, thus, an electrical current applied to the coil results in the coupling or decoupling of the metal contacts with the two contact points.

In addition, the working and protection clock units include termination modules 412 coupled to each relay 414 in the input path from input 1 or input 2 to Multiplexer 405. As further illustrated in FIG. 4, termination modules 440 are coupled to each relay 414 in the output path from Timing Unit 420 output 1 and output. Termination modules 412 and Termination modules 440 provide termination points for received clock references and transmitted clock references, respectively. According to one embodiment, termination modules 412 provide an impedance that matches the receive impedance of the clock I/O card. In addition, termination modules 412 provides protection against excessive voltages that may appear at a clock unit. For another embodiment, termination modules 440 provide an impedance that matches the transmit impedance of a receiving clock I/O card. In addition, termination modules 440 provides protection against excessive voltages that may appear at a clock unit. For yet another embodiment, termination modules 412 and 440 provide impedances via capacitors, resistors, and inductors.

Framers 410 are coupled to each termination module 412 within each clock unit. Framers 410 in the input path of the clock I/O card extract reference clock pulses from data packets received at the clock I/O card inputs. Conversely, framers 410 in the output path of the clock I/O card insert reference clock pulses from data packets to be transmitted from the clock I/O card outputs. According to one embodiment, Framer 410 may be used to either (a) format a framed stream by inserting bits to indicate synchronization messages—when the stream is received on input 1 or input 2 or (b) extract a framed stream from a formatted stream—when the stream is transmitted on output 1 or output 2. For another embodiment, Framer 410 comprises a DS 23152 framer manufactured by Dallas Semiconductor.

Multiplexers 405 in each clock unit are coupled to the framers 410 in the input path of the clock I/O card. Additionally, each multiplexer 405 is coupled to the output of the framer of the opposing card. For example, multiplexer 405 of the XC(W) card is coupled to Framer 414 of the XC(P) card via line 480. Accordingly, multiplexer 405 selects between the two-reference clock sources input 1 and input 2 or the output framer of the opposing card. In another embodiment, multiplexer 405 receives one or more clock sources (not shown) from the trunk cards. The processor controls the selection of clock sources at each multiplexer 405 within the respective clock unit. The selected clock reference is used as a reference for a timing unit 420 within each clock unit. For one embodiment, timing unit 420 is a phase lock loop that includes a hold over memory feature (as described below). For another embodiment, timing unit 420 is an MSTM-S3-T2 timing unit manufactured by Conner-Winfield, USA.

According to one embodiment, the timing units 420 are used to transmit a system master clock in order to synchronize all the cards within a TMO including the trunk and tributary cards. In a further embodiment, timing units 420 are used to produce BITS reference outputs. In the event that the clock references received from multiplexer 405 are interrupted, timing units 420 provide holdover operation. Holdover is the performance of a clock that has lost the external timing reference, due to jitter or clock input error for example, and is using stored data acquired during normal operation to control the output frequency. In one embodiment, timing units 420 provide Stratum 3 accuracy while operating in a holdover mode.

As described above, the protection clock provides redundancy in the event the working clock unit experiences a failure. As a result, the clock source is referenced from the protection clock unit upon the failure of the working clock unit. Since the reference clock source is switched from the working clock unit to the protection clock unit, the reference clock has to be synchronized with timing unit 420 within the protection card.

However, a delay in the reference clock may occur during the switching from the working clock unit to the protection clock unit. For example, the delay in the receipt of the reference signal at the protection timing unit 420 may be caused by the time required to close the relay 414 at the protection clock unit from which the reference signals are received from the clock I/O card. The delay interrupts the synchronization between the reference clock source and the protection timing unit 420.

Often, it requires up to five seconds to resynchronize the reference clock source with the protection timing unit 420. Such a large delay may cause the loss of data packets received at or transmitted from the TMO switch. The loss of data packets forces retransmission, which slows the network. Note that the same problem of resynchronization may occur while switching operation back to the working clock unit from the protection clock unit.

In order to maintain synchronization between the reference clock source and the protection timing unit 420, the extracted frame clocks are transmitted from the working framers 410 in the input path to the multiplexer 405 in the protection clock unit—via line 460, in addition to the transmission to the working multiplexer 405. The clocks received at the protection multiplexer 405 are transmitted to the protection timing unit 420. Similarly, the extracted frame clocks are transmitted from the protection framers 410 to the working multiplexer 405 via line 480. Transmitting the clocks from the working clock unit to the protection clock unit (or vice versa) enables the system clock unit to maintain synchronization between the clock I/O inputs and the timing unit 420 of the other clock unit. The synchronization is maintained although the other card is not physically connected to the clock I/O inputs. This allows the switching between working and protection card (or vice versa) to occur seamlessly and in an efficient manner because the card being switched to has already been synchronized to the clock of the card being switched from, thus reducing hold over and the phase hits related to long hold over modes. For example, if the working card in FIG. 4 has failed, the protection card is now required to generate a system clock via Timing Unit 420 in the protection card. However, prior to switching Timing Unit 420 was already synchronized to the Framer 410 output of the working card via line 480, thus any hold over operation required by protection Timing Unit 420 will be preformed based on the clock provided by Framer 410 of the working card. Further, when protection Timing Unit 420 switches to an input 1 or input 2 clock, the switching will be from the holdover resulting from the clock provided via line 480 (a derivative of the input 1 or input 2 clock) to the actual input 1 or input 2 clock, thus resulting in a seamless switching.

Figure 5:
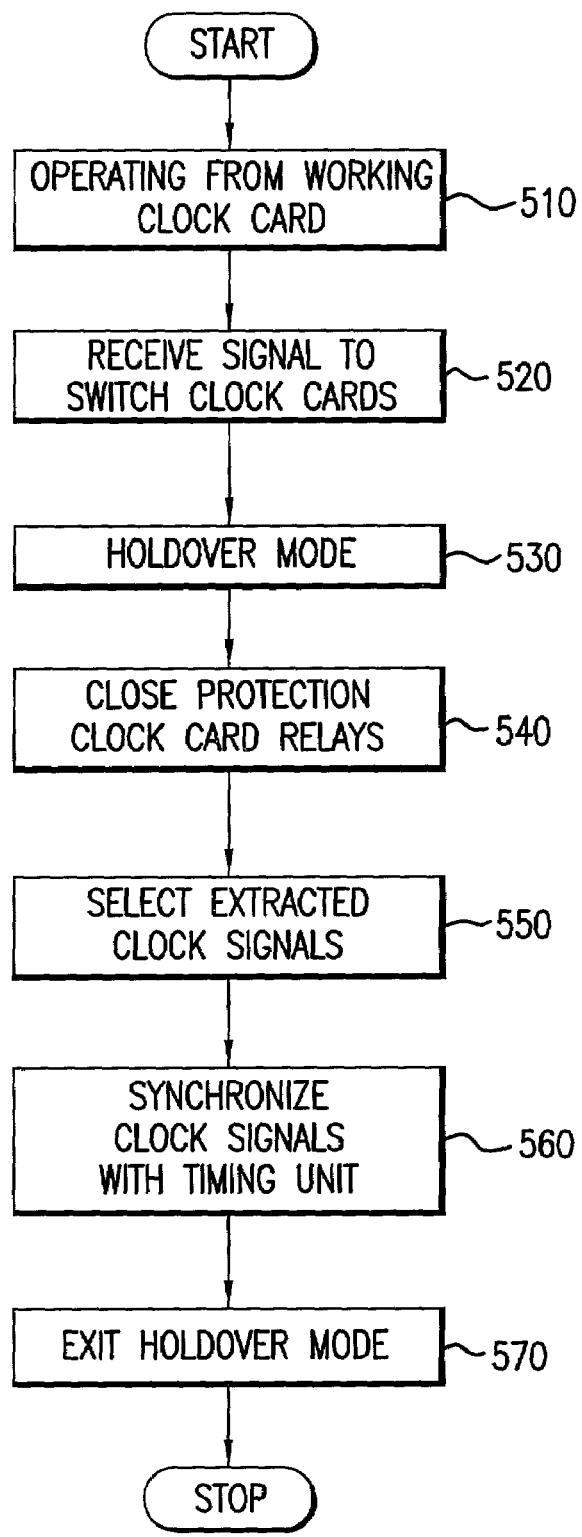
FIG. 5 is a flow diagram of one embodiment of the operation of a system clock unit upon switching operation from one clock unit to another clock unit.

FIG. 5 is a flow diagram of one embodiment of the operation of the system clock unit switching from one clock unit to the other clock unit. For illustrative purposes, this embodiment will describe the switching from the working clock unit to the protection clock unit. At process block 510, the system clock unit is operating from the working clock unit. As described above, multiplexer 405 selects extracted clock signals received from either input 1 or input 2 of the clock I/O card. The clock signals are used by the working timing unit 420 as reference signals. The timing unit 420 transmits clock output signals to the clock I/O card.

In addition, the extracted clock signals are transmitted from the framers 410 to the protection multiplexer 405, as described above. The protection multiplexer 405 selects the same clock signals that are selected at the working multiplexer 405. The clock signals are used by protection timing unit 420 as reference signals. However, since the protection clock unit is not active, protection timing unit 420 does not transmit output clock signals.

At process block 520, a signal is received at the system clock unit indicating a need to switch operation from the working clock unit to the protection clock unit. According to one embodiment the signal is received from a processor (not shown) at the XC(P) card based upon a failure indication. The switch from the working clock unit to the protection clock unit may be triggered by a failure at the working clock unit or some other mechanism in the working cross-connect card.

At process block 530, protection timing unit 420 enters the holdover mode of operation. Accordingly, protection timing unit 420 uses data acquired from the working clock unit to control the output signals during the transition of operation from the working clock unit to the protection clock unit. At process block 540, the relays 410 at the protection clock unit are closed, while the working relays 410 are opened.

At process block 550, the protection multiplexer 405 selects the extracted clock signals received from either of the received inputs of the clock I/O card. At process block 560, protection timing unit 420 is synchronized with the reference clock signals received from the protection multiplexer 405. The synchronization occurs relatively rapidly since the reference is the same as being used as the holdover. Further, there is no delay in timing during the synchronization since protection timing unit 420 is producing output clock signals while in the holdover mode. At process clock 570, protection timing unit 420 exits the holdover mode. Consequently, protection timing unit 420 generates clock signals with the reference received from the protection multiplexer 405.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A network switch comprising:
a clock input/output (I/O) card having a first input;
a first clock unit coupled to the clock I/O card, wherein the first clock unit comprises:
   a first relay coupled to the first input of the clock I/O card;
   a first termination module coupled to the first relay;
   a first framer coupled to the first termination module; and
   a first multiplexer coupled to the first framer; and
a second clock unit coupled to the clock I/O card, wherein the second clock unit comprises:
   a second relay coupled to the first input of the clock I/O card;
   a second termination module coupled to the second relay;
   a second framer coupled to the second termination module; and
   a second multiplexer coupled to the first framer and the second framer,
wherein clock references signals from the first input are received from the first framer whenever the second clock unit is operating in a backup mode,
wherein the first clock unit further comprises a first timing unit coupled to the first multiplexer and the second clock unit further comprises a second timing unit coupled to the second multiplexer,
wherein the second multiplexer selects the input clock reference signals received from the first framer whenever the second clock unit is in the backup mode.

2. The network switch of claim 1 wherein the first multiplexer is further coupled to the second framer in order to receive the clock reference signals from the first input from the second framer whenever the first clock unit is operating in the backup mode.

3. The network switch of claim 1 wherein the clock I/O card comprises a second input.

4. A network switch comprising:
a clock input/output (I/O) card having a first input;
a first clock unit coupled to the clock I/O card, wherein the first clock unit comprises:
   a first relay coupled to the first input of the clock I/O card;
   a first termination module coupled to the first relay;
   a first framer coupled to the first termination module; and
   a first multiplexer coupled to the first framer; and
a second clock unit coupled to the clock I/O card, wherein the second clock unit comprises:
   a second relay coupled to the first input of the clock I/O card;
   a second termination module coupled to the second relay;
   a second framer coupled to the second termination module; and
   a second multiplexer coupled to the first framer and the second framer,
wherein clock reference signals from the first input are received from the first framer whenever the second clock unit is operating in a backup mode, and
wherein the clock I/O card comprises a second input,
wherein the first clock unit comprises:
   a third relay coupled to the second input of the clock I/O card;
   a third termination module coupled to the third relay; and
   a third framer coupled to the third termination module and the first multiplexer.

5. The network switch of claim 4 wherein the second clock unit comprises:
   a fourth relay coupled to the second input of the clock I/O card;
   a fourth termination module coupled to the fourth relay; and
   a fourth framer coupled to the fourth termination module and the second multiplexer.

6. The network switch of claim 5 wherein the first multiplexer and the second multiplexer select between clock reference signals from the first input and the second input.

7. The network switch of claim 6 wherein the first multiplexer transmits the selected clock reference to the first timing unit and the second multiplexer transmits the selected clock reference to the second timing unit.

8. The network switch of claim 7 wherein the first timing unit generates an output clock reference while the first clock unit is in an operating mode.

9. The network switch of claim 7 wherein the second timing unit generates an output clock reference while the second clock unit is in an operating mode.

10. The network switch of claim 6 wherein the first multiplexer also receives clock reference signals from one or more trunk cards within the network switch and selects between first input, the second input and the one or more clock references received from the one or more trunk cards.

11. The network switch of claim 1 wherein the second clock unit goes from the backup mode to an operating mode whenever the first clock unit goes into a non-operating mode.

12. The network switch of claim 11 wherein the second timing unit goes into a holdover mode whenever the first clock unit enters a non-operating mode.

13. The network switch of claim 12 wherein the clock reference signals from the first input are synchronized with the second timing unit.

14. The network switch of claim 13 wherein the second timing unit exits the holdover mode upon synchronization with the first input.

15. A method comprising:
receiving extracted frame clocks at a protection clock unit from a framer within an operating clock unit;
transmitting the extracted frame clocks to a timing unit within the protection clock unit;
entering a holdover mode at the timing unit, wherein in the holdover mode the timing unit generates output clock signals based upon the extracted frame clocks;
receiving an input clock reference from a clock input/output (I/O) card after the timing unit enters the holdover mode; and
synchronizing the input clock reference with the output clock signals generated by the timing unit.

16. The method of claim 15 further comprising exiting the holdover mode after synchronizing the input clock reference with the output clock signals generated by the timing unit.

17. The method of claim 15 wherein receiving the input clock reference comprises:
closing a relay within the protection clock unit that is coupled to a first input of the clock I/O card; and
extracting the input clock reference.

* * * * *